United States Patent
Owng et al.

(10) Patent No.: US 8,368,265 B2
(45) Date of Patent: Feb. 5, 2013

(54) ELECTRIC MOTOR HAVING HEAT PIPES

(75) Inventors: Rong-Jong Owng, Nantou County (TW); Chia-Wen Ruan, Nantou County (TW); Yi-Tang Wei, Nantou County (TW); Ming-Chen Liao, Nantou County (TW)

(73) Assignees: Chia-Wen Ruan, Nantou (TW); Joy Ride Technology Co., Ltd., Nantou (TW)

( * ) Notice: Subject to any disclaimer, the term of this patent is extended or adjusted under 35 U.S.C. 154(b) by 296 days.

(21) Appl. No.: 12/951,213

(22) Filed: Nov. 22, 2010

(65) Prior Publication Data

US 2012/0001503 A1 Jan. 5, 2012

(30) Foreign Application Priority Data

Jul. 1, 2010 (TW) .............................. 99121652 A

(51) Int. Cl.
*H02K 9/00* (2006.01)
*H02K 9/20* (2006.01)
(52) U.S. Cl. .............. 310/54; 310/52; 310/60 A; 310/61
(58) Field of Classification Search ............... 310/52, 310/54, 60 A, 61; *H02K 9/00, 9/20*
See application file for complete search history.

(56) References Cited

U.S. PATENT DOCUMENTS

| | | | | |
|---|---|---|---|---|
| 3,801,843 A * | 4/1974 | Corman et al. | .................. | 310/52 |
| 4,870,307 A * | 9/1989 | Kitamura et al. | ............... | 310/54 |
| 6,218,747 B1* | 4/2001 | Tsuruhara | ........................ | 310/54 |
| 7,327,055 B2* | 2/2008 | Devine | ............................. | 310/58 |
| 2004/0084977 A1* | 5/2004 | Devine | ............................. | 310/61 |
| 2008/0265699 A1* | 10/2008 | Devine | ............................. | 310/63 |
| 2012/0001503 A1* | 1/2012 | Owng et al. | ..................... | 310/54 |
| 2012/0169158 A1* | 7/2012 | Buttner et al. | ................... | 310/54 |

* cited by examiner

Primary Examiner — John K Kim
(74) Attorney, Agent, or Firm — Greenberg Traurig, LLP

(57) ABSTRACT

An electric motor includes a rotor unit disposed rotatably in a motor housing. The rotor unit includes a rotor shaft rotatable relative to the motor housing about a central axis of the motor housing, a heat conductive seat mounted with a magnet member and in sleeved relationship to an intermediate portion of the rotor shaft, and angularly spaced apart heat pipes extending through an end portion of the rotor shaft thicker than the intermediate portion and into the seat. Each heat pipe has an end portion disposed outward of the rotor shaft, and extending into and in thermal contact with a heat conductive impeller connected to the second end portion of the rotor shaft to co-rotate with the rotor shaft and covered by an outer shell cap. A stator unit is mounted fixedly in and is in thermal contact with the motor housing, and is disposed around the rotor unit.

9 Claims, 5 Drawing Sheets

ELECTRIC MOTOR HAVING HEAT PIPES

CROSS-REFERENCE TO RELATED APPLICATION

This application claims priority of Taiwanese Application No. 099121652, filed on Jul. 1, 2010.

BACKGROUND OF THE INVENTION

1. Field of the Invention

The invention relates to an electric motor, and more particularly, to an electric motor having a heat pipe.

2. Description of the Related Art

In each of Taiwanese Utility Model Nos. M331251, M322677 and M300395, and Taiwanese Patent No. I250718, an electric motor is disclosed, which utilizes a fan impeller driven by a rotor shaft to thereby generate cooled air flow for heat dissipation. The cooled air flow generated by the fan impeller passes through the interior of a rotor of the motor. As a result, the fan impeller provides an inferior cooling effect when the interior of the rotor contains too much dirt.

Another conventional electric motor disclosed in U.S. Pat. No. 4,406,959 includes a heat pipe formed in a rotor shaft and extending along a central axis of the rotor shaft. Due to the presence of the heat pipe, the rigidity of the rotor shaft is reduced, thereby reducing a torsional force provided by the motor. Furthermore, heat from the periphery of the rotor is transmitted to the heat pipe through relatively long heat-conduction paths, thereby resulting in an inferior heat dissipation effect. Thus, for an electric motor having small size and high power, heat accumulation may result in demagnetization of laminating members of the rotor.

SUMMARY OF THE INVENTION

Therefore, an object of the present invention is to provide an electric motor that can overcome the aforesaid disadvantages of the prior art.

According to the present invention, an electric motor comprises:

a motor housing including a heat conductive tube body that extends in an axial direction, the tube body having opposite inner and outer annular surfaces, and first and second open ends opposite to each other in the axial direction;

a rotor unit disposed rotatably in the motor housing and including a rotor shaft mounted rotatably within the motor housing and rotatable relative to the motor housing about a central axis of the tube body, the rotor shaft having a first end portion, a second end portion opposite to the first end portion in the axial direction, and an intermediate portion interconnecting the first and second portions, the second end portion having a diameter greater than that of the intermediate portion, a heat conductive magnet-mounting seat sleeved fixedly on the intermediate portion of the rotor shaft, a magnet member mounted in the magnet-mounting seat, and a plurality of heat pipes angularly spaced apart from each other about the central axis, and extending in the axial direction through the second end portion of the rotor shaft and into the magnet-mounting seat, each of the heat pipes having an end portion disposed outwardly of the second end portion of the rotor shaft;

a stator unit mounted fixedly in and in thermal contact with the motor housing, and disposed around the rotor unit; and a heat conductive impeller connected to the second end portion of the rotor shaft such that the impeller is co-rotatable with the rotor shaft, the end portions of the heat pipes extending into and being in thermal contact with the impeller.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
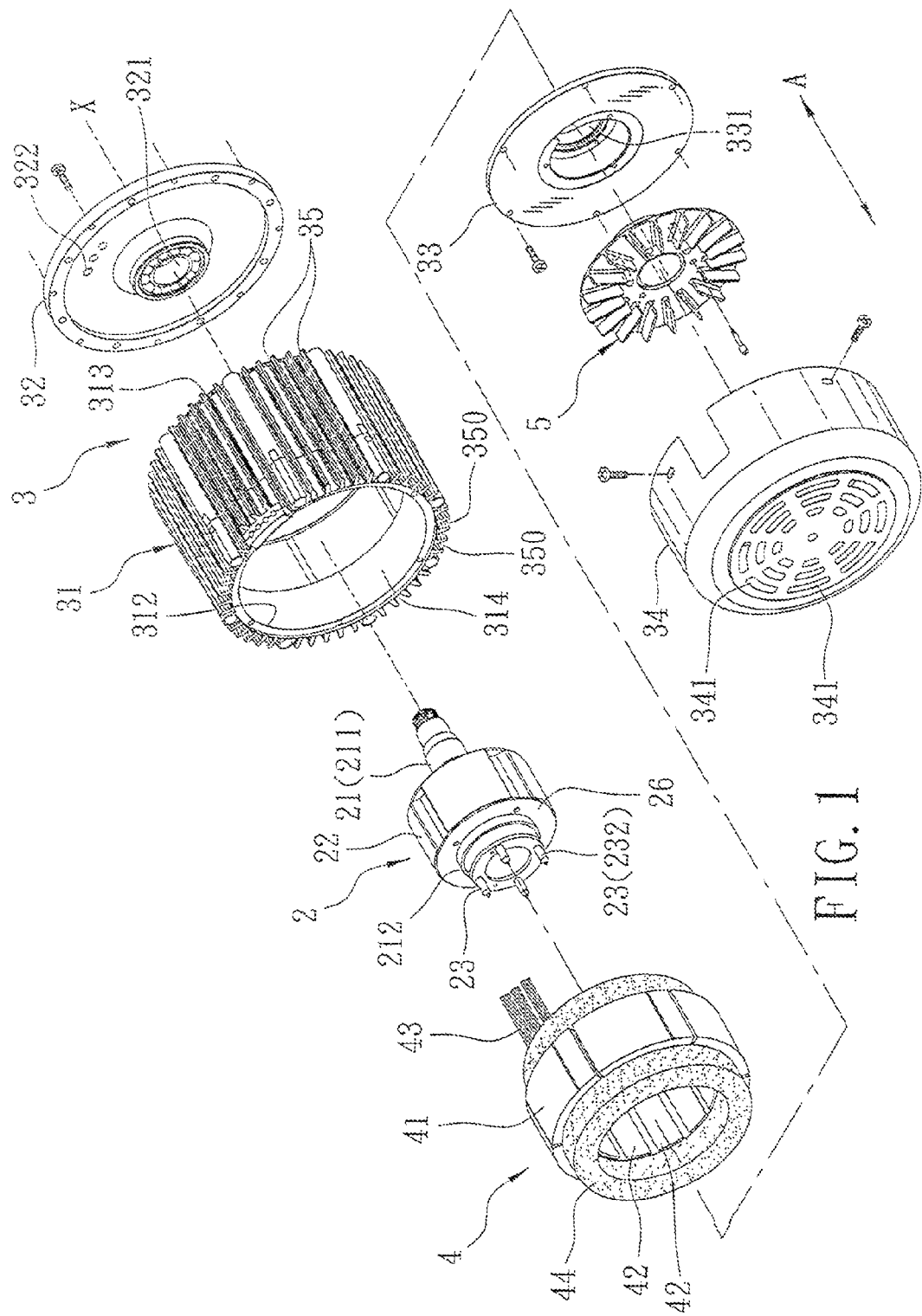
FIG. 1 is a partly exploded perspective view showing the first preferred embodiment of an electric motor according to the present invention.

Before the present invention is described in greater detail, it should be noted that like elements are denoted by the same reference numerals throughout the disclosure.

Figure 3:
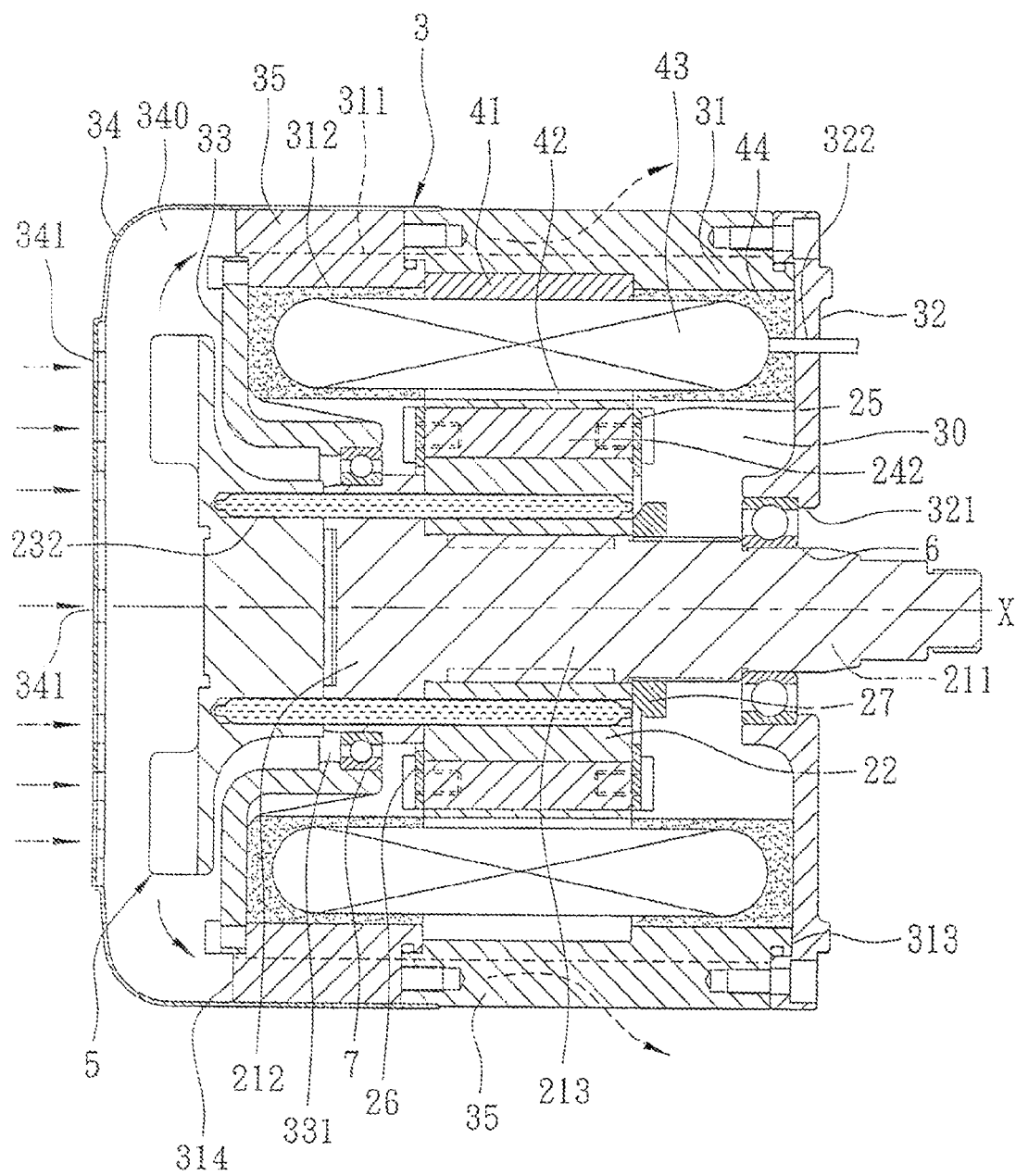
FIG. 3 is a schematic sectional view showing the first preferred embodiment.

Referring to FIGS. 1 and 3, the first preferred embodiment of an electric motor, for example, a permanent magnet brushless motor, according to the present invention is shown to include a motor housing 3, a rotor unit 2, a stator unit 4, and a heat conductive impeller 5.

The motor housing 3 includes a tube body 31, first and second cover bodies 32, 33, and an outer shell cap 34. The tube body 31 extends in an axial direction (A), and has opposite inner and outer annular surfaces 312, 311, and first and second open ends 313, 314 opposite to each other in the axial direction (A). The first cover body 32 is mounted on the first open end 313 of the tube body 31, and is formed with a bearing hole 321 for mounting a bearing 6 therein (see FIG. 3). The second cover body 33 is mounted on the second open end 314 of the tube body 31, and is formed with a bearing hole 331 for mounting a bearing 7 therein (see FIG. 3). The first and second cover bodies 32, 33 cooperate with the tube body to define a closed accommodating space 30 for receiving the rotor unit 2 and the stator unit 4. The outer shell cap 34 is mounted on the tube body 31 and configured with an inner receiving space 340 (FIG. 3). The outer shell cap 34 is formed with a plurality of air inlets 341 in spatial communication with the inner receiving space 340. In this embodiment, the motor housing 3 further includes a plurality of heat dissipating fins 35 formed on the outer annular surface 311 of the tube body 31 and covered partially by the outer shell cap 34. The heat dissipating fins 35 extend in the axial direction (A) and are angularly spaced apart from each other about a central axis (X) of the tube body 31 such that an air-flow channel 350 is defined between each adjacent pair of the heat dissipating fins 35 and is in spatial communication with the inner receiving space 340 in the outer shell cap 34.

Figure 2:
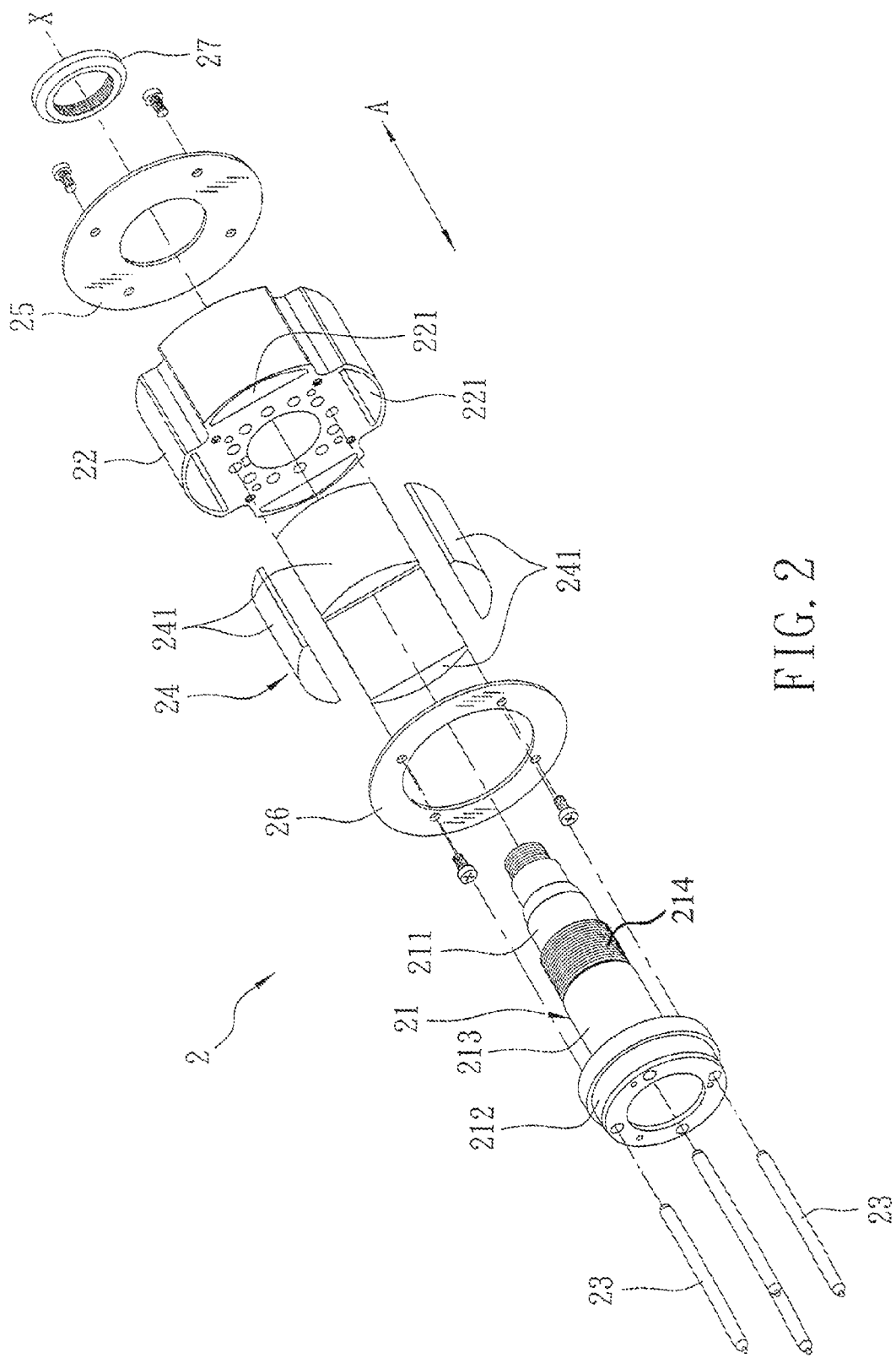
FIG. 2 is an exploded perspective view showing a rotor unit of the first preferred embodiment.

Referring further to FIG. 2, the rotor unit 2 is disposed rotatably in the motor housing 3, and includes a rotor shaft 21, a heat conductive magnet-mounting seat 22, a magnet member 24, a plurality of heat pipes 23, first and second stop rings 25, 26, and a fastener ring 27. The rotor shaft 21 is mounted rotatably within the motor housing 3, and is rotatable relative to the motor housing 3 about the central axis (X). The rotor shaft 31 has a first end portion 211 extending through the bearing hole 321 in the first cover body 32 of the motor housing 3, a second end portion 212 opposite to the first end portion 211 in the axial direction (A) and extending through the bearing hole 331 in the second cover body 33 of the motor housing 3, and an intermediate portion 213 interconnecting the first and second end portions 211, 212. The second end portion 212 has a diameter greater than that of the intermediate portion 213. The magnet-mounting seat 22 is sleeved fixedly on the intermediate portion 213 of the rotor shaft 21, and is formed with a plurality of magnet-mounting holes 221. The magnet-mounting holes 221 extend in the axial direction (A), are arranged around the rotor shaft 21, and are angularly spaced apart from each other about the central axis (X). In this embodiment, the magnet-mounting seat 22 is made from a magnetic material, and consists of a plurality of laminating silicon steel members (not shown). The magnet member 24 is mounted in the magnet-mounting seat 22, and includes a plurality of magnets 241 mounted respectively in the magnet-mounting holes 221 in the magnet-mounting seat 22. The first and second stop rings 25, 26 are mounted respectively on opposite sides of the magnet-mounting seat 22 in the axial direction (A) for positioning the magnets 241 in the magnet-mounting seat 22. The fastener ring 27 is connected threadedly to a thread section 214 of the intermediate portion 213 of the rotor shaft 21 for fastening the first stop ring 25. The heat pipes 23 are angularly spaced apart from each other about the central axis (X), and extend in the axial direction (A) through the second end portion 212 of the rotor shaft 21 and into the magnet-mounting seat 22. Each heat pipe 23 has an end portion 232 disposed outwardly of the second end portion 212 of the rotor shaft 21 (see FIG. 3). It is noted that the heat pipes 23 are arranged along the periphery of the second end portion 212 of the rotor shaft 21. In addition, the number of the heat pipes 23 can be determined based on heat generated by the magnet-mounting seat 22 of the rotor unit 2.

The stator unit 4 is mounted fixedly in and is in thermal contact with the motor housing 3. The stator unit 4 is disposed around the rotor unit 2, and includes a magnetic core 41, a plurality of stator windings 43, and a heat conductive adhesive 44. The magnetic core 41 is sleeved on the rotor unit 2 and is in thermal contact with the inner annular surface 312 of the tube body 31 of the motor housing 3. The magnetic core 41 has a plurality of stator poles 42 which are angularly spaced apart from each other about the central axis (X). The stator windings 43 are wound respectively on the stator poles 42, and extend respectively through apertures 322 in the first cover body 32 outwardly of the motor housing 3. The heat conductive adhesive 44 is coated over the stator windings 43, and is in thermal contact with the inner annular surface 312 of the tube body 31 of the motor housing 3. The heat conductive adhesive 44 is a mixture of a resin; and a heat conductive material that is selected from a group consisting of silicon carbide, aluminum, boron nitride, aluminum nitride, and combinations thereof.

The heat conductive impeller 5 is connected to the second end portion 212 of the rotor shaft 21 such that the impeller 5 is co-rotatable with the rotor shaft 21. The impeller 5 is received in the inner receiving space 340 in the outer shell cap 34 of the motor housing 3. In addition, the end portions 232 of the heat pipes 23 are permitted to extend into the impeller 5, which is in thermal contact with the end portions 232 of the heat pipes 23, as shown in FIG. 3.

In operation of the electric motor, heat from the magnet-mounting seat 22 of the rotor unit 2 is conducted to the impeller 5 through the heat pipes 23, thereby cooling the rotor unit 2. At the same time, heat from the stator unit 4 is conducted to the heat dissipating fins 35, thereby cooling the stator unit 4. Furthermore, heat accumulated in the motor housing 3 can be effectively dissipated by cool air that is generated as a result of rotation of the impeller 5 and that flows into the inner receiving space 340 in the outer shell cap 34 via the air inlets 341, and passes through the air-flow channels 350. Therefore, the electric motor of the present invention can provide an enhanced heat dissipation effect. In addition, since the heat pipes 23 are arranged along the periphery of the second end portion 212 of the rotor shaft 21, the rotor shaft 21 has a better rigidity as compared to the prior art to thereby provide a greater torsional force. In addition, the heat from the rotor unit 2 can be transferred to the heat pipes 23 through relatively short heat-conduction paths.

Figure 4:
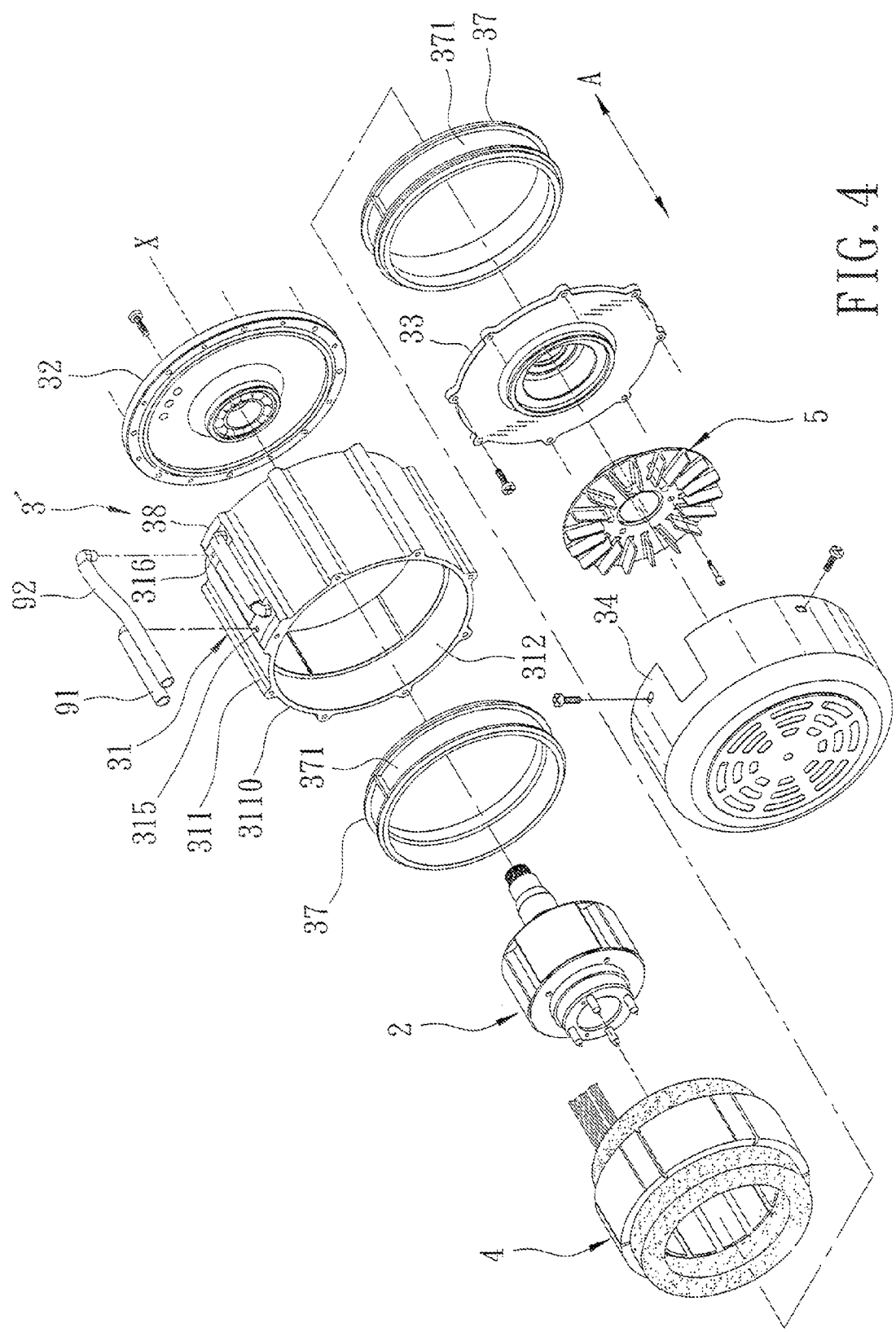
FIG. 4 is a partly exploded perspective view showing the second preferred embodiment of an electric motor according to the present invention.
Figure 5:
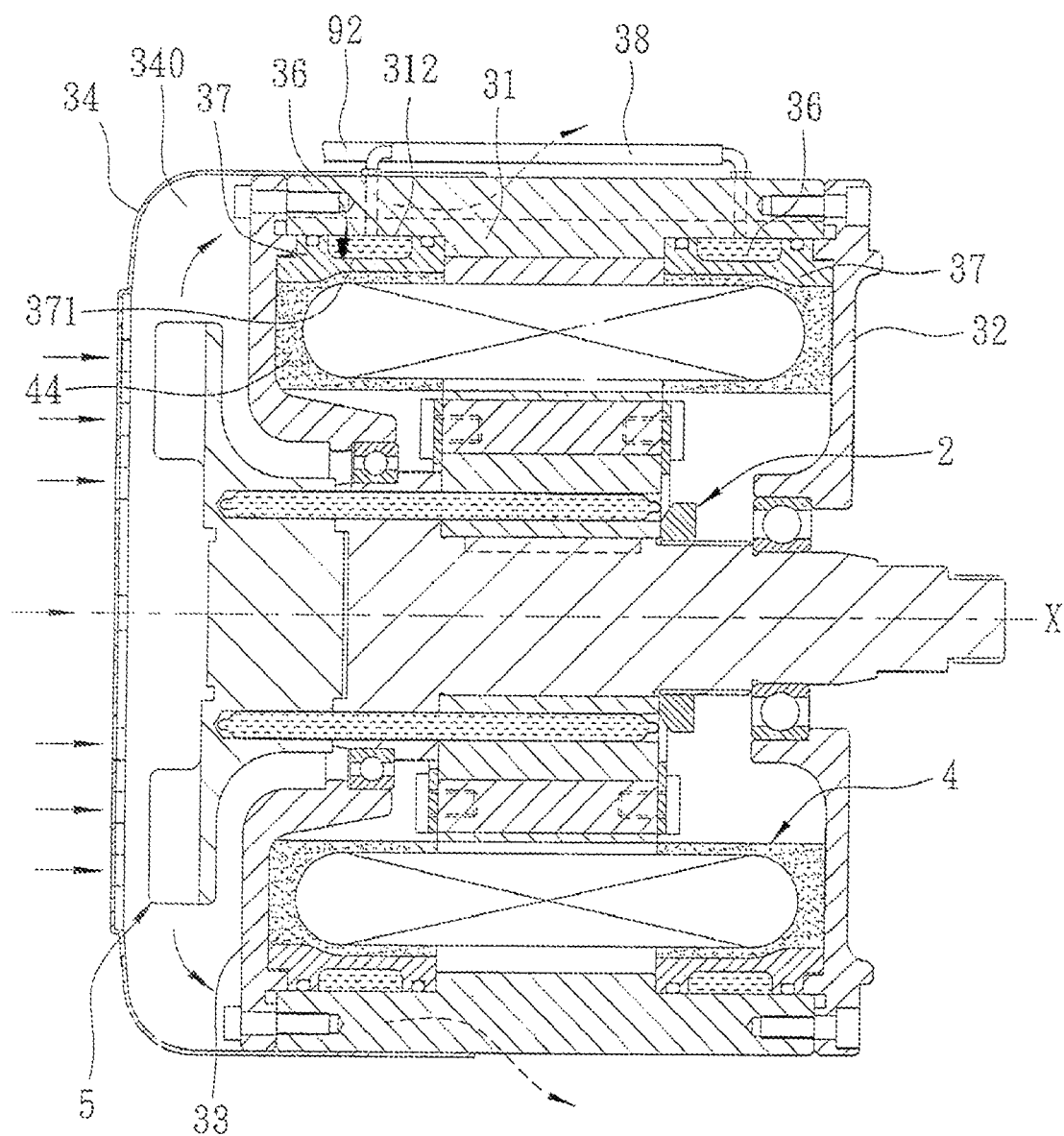
FIG. 5 is a schematic sectional view showing the second preferred embodiment.

FIGS. 4 and 5 illustrate the second preferred embodiment of an electric motor according to this invention, which is a modification of the first preferred embodiment. In this embodiment, the heat dissipating fins 35 in the first preferred embodiment are omitted.

Furthermore, the motor housing 3 is configured with a pair of C-shape heat exchange conducts 36 opposite to each other in the axial direct (A) (see FIG. 5). The heat exchange conducts 36 are disposed around the stator unit 4 for permitting a coolant, such as cooling water 312 to pass therethrough so as to remove heat from the stator unit 4. In this embodiment, the motor housing 3 further includes a pair of heat conductive rings 37 and a communicating pipe 38. The rings 37 are disposed between the tube body 31 and the stator unit 4 and are in thermal contact with the heat conductive adhesive 44. Each ring 37 has a concave outer surface 371 facing the inner annular surface 312 of the tube body 31 to cooperatively define a corresponding one of the heat exchange conduits 36.

The tube body 31 is formed with a coolant inlet 315 and a coolant outlet 316 that are respectively in fluid communication with the heat exchange conduits 36 such that the coolant flows into the heat exchange conduits 36 through the coolant inlet 315 and out of the heat exchange conduits 36 through the coolant outlet 316. Two pipes 91, 92 are connected respectively to the coolant inlet 315 and the coolant outlet 316 for transmission of the coolant and pipe 38 transmits coolant between heat exchange conduit 36. As a result, heat from the stator unit 4 can be effectively dissipated by the heat exchange conduits 36. In addition, the outer annular surface 311 of the tube body 31 is formed with a plurality of grooves 3110 extending in the axial direction (A), spaced angularly apart from each other about the central axis (X) and in spatial communication with the inner receiving space 340 in the outer shell cap 34. The air grooves 3110 permit air from the inner receiving space 340 in the outer shell cap 34 to pass therethrough.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. An electric motor comprising:
   a motor housing including a heat conductive tube body that extends in an axial direction, said tube body having opposite inner and outer annular surfaces, and first and second open ends opposite to each other in the axial direction;

a rotor unit disposed rotatably in said motor housing and
   including
   a rotor shaft mounted rotatably within said motor housing
      and rotatable relative to said motor housing about a
      central axis of said tube body, said rotor shaft having a
      first end portion, a second end portion opposite to said
      first end portion in the axial direction, and an interme-
      diate portion interconnecting said first and second end
      portions, said second end portion having a diameter
      greater than that of said intermediate portion,
   a heat conductive magnet-mounting seat mounted in a
      sleeved relationship to said intermediate portion of said
      rotor shaft,
   a magnet member mounted in said magnet-mounting seat,
      and
   a plurality of heat pipes angularly spaced apart from each
      other about the central axis, and extending in the axial
      direction through said second end portion of said rotor
      shaft and into said magnet-mounting seat, each of said
      heat pipes having an end portion disposed outwardly of
      said second end portion of said rotor shaft;
a stator unit mounted fixedly in and in thermal contact with
   said motor housing, and disposed around said rotor unit;
   and
a heat conductive impeller connected to said second end
   portion of said rotor shaft such that said impeller is
   co-rotatable with said rotor shaft, said end portions of
   said heat pipes extending into and being in thermal con-
   tact with said impeller.

2. The electric motor as claimed in claim 1, wherein said motor housing further includes:
   an outer shell cap mounted on said tube body for covering said impeller, configured with an inner receiving space for receiving said impeller, and formed with a plurality of air inlets in spatial communication with said inner receiving space;
   a plurality of heat dissipating fins formed on said outer annular surface of said tube body, extending in the axial direction and angularly spaced apart from each other about the central axis such that an air-flow channel is defined between each adjacent pair of said heat dissipating fins and is in spatial communication with said inner receiving space in said outer shell cap.

3. The electric motor as claimed in claim 1, wherein said motor housing further includes
   a first cover body mounted on said first open end of said tube body and permitting extension of said first end portion of said rotor shaft of said rotor unit, and
   a second cover body mounted on said second open end of said tube body and permitting extension of said second end portion of said rotor shaft of said rotor unit; and
   wherein said first and second cover bodies cooperate with said tube body to define a closed accommodating space for receiving said rotor unit and said stator unit.

4. The electric motor as claimed in claim 1, wherein said motor housing is configured with at least one heat exchange conduit disposed around said stator unit for permitting a coolant to pass therethrough so as to remove heat from said stator unit.

5. The electric motor as claimed in claim 4 wherein:
   said motor housing is configured with a pair of said heat exchange conduits opposite to each other in the axial direction;
   said motor housing further includes
      a pair of heat conductive rings disposed between said tube body and said stator unit and in thermal contact with said stator unit, each of said rings having a concave outer surface facing said inner annular surface of said tube body to cooperatively define a corresponding one of said heat exchange conduits, and
      a communicating pipe interconnecting said heat exchange conduits; and
   said tube body is formed with a coolant inlet and a coolant outlet that are respectively in fluid communication with said heat exchange conduits such that the coolant flows into said heat exchange conduits through said coolant inlet and out of said heat exchange conduits through said coolant outlet.

6. The electric motor as claimed in claim 5, wherein each of said heat exchange conduits is C-shaped.

7. The electric motor as claimed in claim 1, wherein:
   said magnet-mounting seat of said rotor unit is made from a magnetic material, and is formed with a plurality of magnet-mounting holes extending in the axial direction, arranged around said rotor shaft and spaced angularly apart from each other about the central axis;
   said magnet member includes a plurality of magnets mounted respectively in said magnet-mounting holes in said magnet-mounting seat; and
   said rotor unit further includes first and second stop rings mounted respectively on opposite sides of said magnet-mounting seat in the axial direction for positioning said magnets in said magnet-mounting seat.

8. The electric motor as claimed in claim 1, wherein said stator unit includes:
   a magnetic core mounted on said rotor unit in sleeved relationship and in thermal contact with said inner annular surface of said tube body of said motor housing, said magnetic core having a plurality of stator poles which are angularly spaced apart from each other about the central axis;
   a plurality of stator windings wound respectively on said stator poles; and
   a heat conductive adhesive coated over said stator windings and in thermal contact with said inner annular surface of said tube body of said motor housing.

9. The electric motor as claimed in claim 8, wherein said heat conductive adhesive is a mixture of a resin, and a heat conductive material that is selected from a group consisting of silicon carbide, aluminum, boron nitride, aluminum nitride, and combinations thereof.

* * * * *